United States Patent [19]
Olsen et al.

[11] Patent Number: 5,488,218
[45] Date of Patent: Jan. 30, 1996

[54] ELECTRIC HEAT CONTROL APPARATUS AND METHOD

[75] Inventors: Mark W. Olsen, Carrollton; Joe R. Powell, Garland; Russell C. Tharp, Ft. Worth; Stephen A. Walter, Flower Mound, all of Tex.

[73] Assignee: Lennox Industries Inc., Dallas, Tex.

[21] Appl. No.: 17,689

[22] Filed: Feb. 12, 1993

[51] Int. Cl.[6] .................................................. H05B 1/02
[52] U.S. Cl. ..................... 219/492; 219/497; 219/494; 392/360; 307/41; 165/29; 165/14
[58] Field of Search .................................... 219/492, 497, 219/506, 483–486, 481, 494; 392/360–369; 165/26, 14, 29, 32, 33; 307/38–41

[56] References Cited

U.S. PATENT DOCUMENTS

| | | | |
|---|---|---|---|
| 3,770,977 | 11/1973 | McIntosh | 307/41 |
| 3,912,906 | 10/1975 | McIntosh et al. | 219/486 |
| 4,141,408 | 2/1979 | Garnett | 165/29 |
| 4,171,772 | 10/1979 | Hays et al. | 219/365 |
| 4,302,663 | 11/1981 | Chesnut et al. | 219/497 |
| 4,459,469 | 7/1984 | Ishima | 219/497 |
| 4,638,147 | 1/1987 | Dytch et al. | 219/308 |
| 4,845,341 | 7/1989 | Rae | 219/492 |
| 4,868,368 | 9/1989 | Araki | 219/216 |
| 4,912,300 | 3/1990 | Hennuy et al. | 219/370 |

*Primary Examiner*—Mark H. Paschall
*Attorney, Agent, or Firm*—W. Kirk McCord

[57] ABSTRACT

Activation and deactivation of a plurality of heating elements in an electric heating system are separately controllable in accordance with the present invention. Individual heating elements are sequentially activated in response to a demand for heat. A predetermined time delay is imposed between successive activations of the heating elements to allow time to satisfy the demand for heat before another heating element is activated. Normally, the heating elements are also deactivated sequentially in response to a reduced demand for heat, with a predetermined time delay between successive deactivations to allow time to respond to the reduced demand for heat before another heating element is deactivated. A temperature sensor is located in the air discharge plenum of the heating system for sensing the temperature of the discharge air. The discharge air temperature is used to control the operation of the heating elements, a two-speed heat pump, and the "off cycle" of the heating system blower.

10 Claims, 9 Drawing Sheets

ELECTRIC HEAT CONTROL APPARATUS AND METHOD

TECHNICAL FIELD

This invention relates generally to electric heating systems having a plurality of electrically activatable heating elements and, in particular, to improved apparatus and method for controlling the heating elements.

BACKGROUND ART

An electric heating system typically includes a plurality of electrically resistive heating elements, which give off heat in response to the passage of electric current therethrough, and a blower for circulating air between the heating system and an enclosure. According to prior practice, a demand for heat signal from an indoor thermostat or the like activates the heating elements and air moving across the heating elements carries the heat by convection to the enclosure to satisfy the demand for heat.

Typically, an electric heating system also includes a plurality of electrically operable sequencers for sequentially activating the heating elements in response to a demand for heat. For example, a one minute delay between successive activations may be built in. Sequential activation of the heating elements inhibits unwanted power surges, which may occur if all of the elements are activated at the same time. Once the demand for heat signal is received, however, all of the heating elements are activated, albeit sequentially, until the demand for heat is satisfied. The heating elements are not separately controllable.

Separate control of the heating elements is desirable in order to activate only the number of heating elements required to meet the demand for heat, thereby reducing energy consumption and cost. Further, when the electric heating system is used in conjunction with a heat pump, the heating system is typically used as a backup because operation of the heat pump is usually more efficient. Therefore, only the heat pump is used to satisfy the initial demand for heat, which is referred to as the first stage heat demand. If the indoor temperature falls below a predetermined threshold temperature, which is less than the temperature corresponding to the first stage demand, a second stage demand for heat is indicated. The electric heating system is activated in response to the second stage demand. For example, an indoor thermostat may be set at 69° F. If the indoor temperature drops below 69° F., the thermostat sends a signal indicating a demand for first stage heating and the heat pump is activated. If the indoor temperature continues to fall and reaches a lower temperature (e.g., 65° F.), the thermostat will signal a demand for second stage heating, which activates the electric heating system. The electric heating system is used only when the heat pump is unable to maintain the desired indoor temperature.

The electric heating system is used as the primary heat source when the heat pump is not able to function efficiently. For example, when the outside air temperature drops below a minimum temperature (e.g., 10° F.) the heat pump may not be operable due to a low ambient temperature condition. In that case, the electric heating system is used as the primary source of heat.

Another problem associated with prior art heating systems is the problem of the blower cycling on and off when the indoor temperature is at or near the desired temperature setting, which results in excessive energy consumption and blower performance degradation. One attempt to solve this problem has involved building in a fixed time delay so that the blower continues to operate for a period of time equal to the built-in time delay after a "blower off" condition is indicated. One problem with this approach is that the optimum time between blower cycles varies among individual heating systems. Therefore, a fixed time delay is selected as a compromise, which may not be optimal for a particular system.

DISCLOSURE OF INVENTION

In accordance with the present invention, apparatus is provided for controlling a heating system of the type having a thermostat for sensing temperature in an enclosure and for generating a demand for heat signal when the enclosure temperature is below a predetermined temperature setting, a plurality of electrically activatable heating elements and a blower for discharging air from the heating system to the enclosure. The control apparatus includes temperature sensing means for sensing discharge air temperature and control means responsive to the demand for heat signal for sequentially activating the heating elements when the discharge air temperature is below a predetermined first temperature until the discharge air temperature equals or exceeds the first temperature. The control means is further operable for deactivating at least some of the activated heating elements when the discharge air temperature is above a predetermined second temperature which is higher than the first temperature. The control means is further responsive to cessation of the demand for heat signal for deactivating all of the activated heating elements.

In accordance with one feature of the invention, the control means includes delay means for imposing a predetermined time delay between successive activations of the heating elements so that only those heating elements which are required to satisfy the demand for heat are activated. In accordance with another feature of the invention, the control means includes means for activating the blower in response to the demand for heat signal and for deactivating the blower in the absence of the demand for heat signal when the discharge air temperature satisfies a predetermined temperature condition.

In accordance with a further feature of the invention, the control means is operable for sequentially deactivating the activated heating elements when the discharge air temperature exceeds the second temperature but not a predetermined third temperature which is higher than the second temperature, until the discharge air temperature does not exceed the second temperature. In accordance with yet another feature of the invention, the delay means is further operable for imposing a predetermined time delay between successive deactivations of the activated heating elements when the discharge air temperature exceeds the second temperature but not the third temperature.

In one embodiment of the invention, the activated heating elements are deactivated at a predetermined first rate when the discharge air temperature is between the second and third temperatures and at a predetermined second rate which is faster than the first rate when the discharge air temperature is greater than the third temperature. For example, when the discharge air temperature is greater than the second temperature but not greater than the third temperature, the activated heating elements are deactivated one at a time, with the predetermined time delay between successive deactivations. However, if the discharge air temperature is greater than the third temperature, the activated heating elements are deactivated two at a time, with the predetermined time delay between successive deactivations of each pair of heating elements. In an alternate embodiment, all of the activated heating elements are deactivated substantially simultaneously when the discharge air temperature is greater than the third temperature.

BEST MODE FOR CARRYING OUT THE INVENTION

The best mode for carrying out the invention will be described with reference to the accompanying drawings. The drawings are not necessarily to scale and in some instances proportions may have been exaggerated in order to more clearly depict certain features of the invention. Like parts are marked with the same respective reference numbers throughout the drawings.

Figure 1:
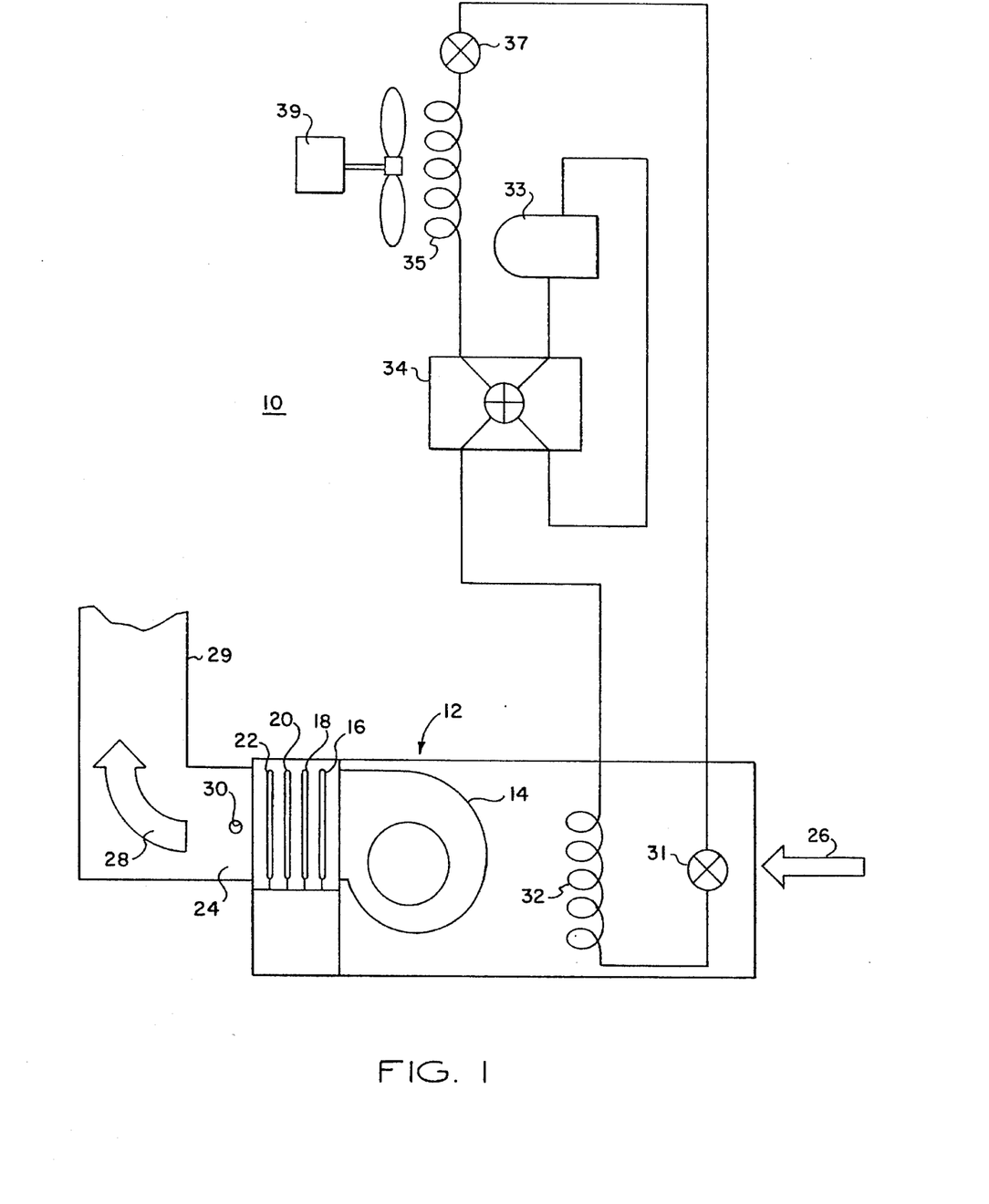
FIG. 1 is a schematic of a heating system with electrical heating elements, an air blower, and heat pump.

Referring to FIG. 1, a heating system 10 includes an indoor portion 12 having an air blower 14, a plurality of electrically activatable heating elements 16, 18, 20 and 22, and a discharge plenum 24 downstream of heating elements 16, 18, 20 and 22. One skilled in the art will recognize that the number of heating elements is variable. The four heating elements 16, 18, 20 and 22 are used as an example. Blower 14 is adapted to circulate air through an enclosure (not shown). Blower 14 suctions air from the enclosure, as indicated by arrow 26 and discharges air to the enclosure, as indicated by arrow 28. Plenum 24 is in fluid communication with an air duct 29 which supplies discharge air to the enclosure. A temperature sensor 30 is located in plenum 24 for sensing temperature of the discharge air. Alternatively, temperature sensor 30 may be located at another appropriate location within indoor portion 12 for sensing discharge air temperature.

Indoor portion 12 also includes an indoor expansion device 31 and an indoor coil 32 of a heat pump. The heat pump also includes a compressor 33, reversing valve 34 (for cooling and defrost), outdoor coil 35, outdoor expansion device 37 and outdoor fan 39.

COORDINATE CONTROL OF HEAT PUMP AND ELECTRIC HEATING

Figure 2:
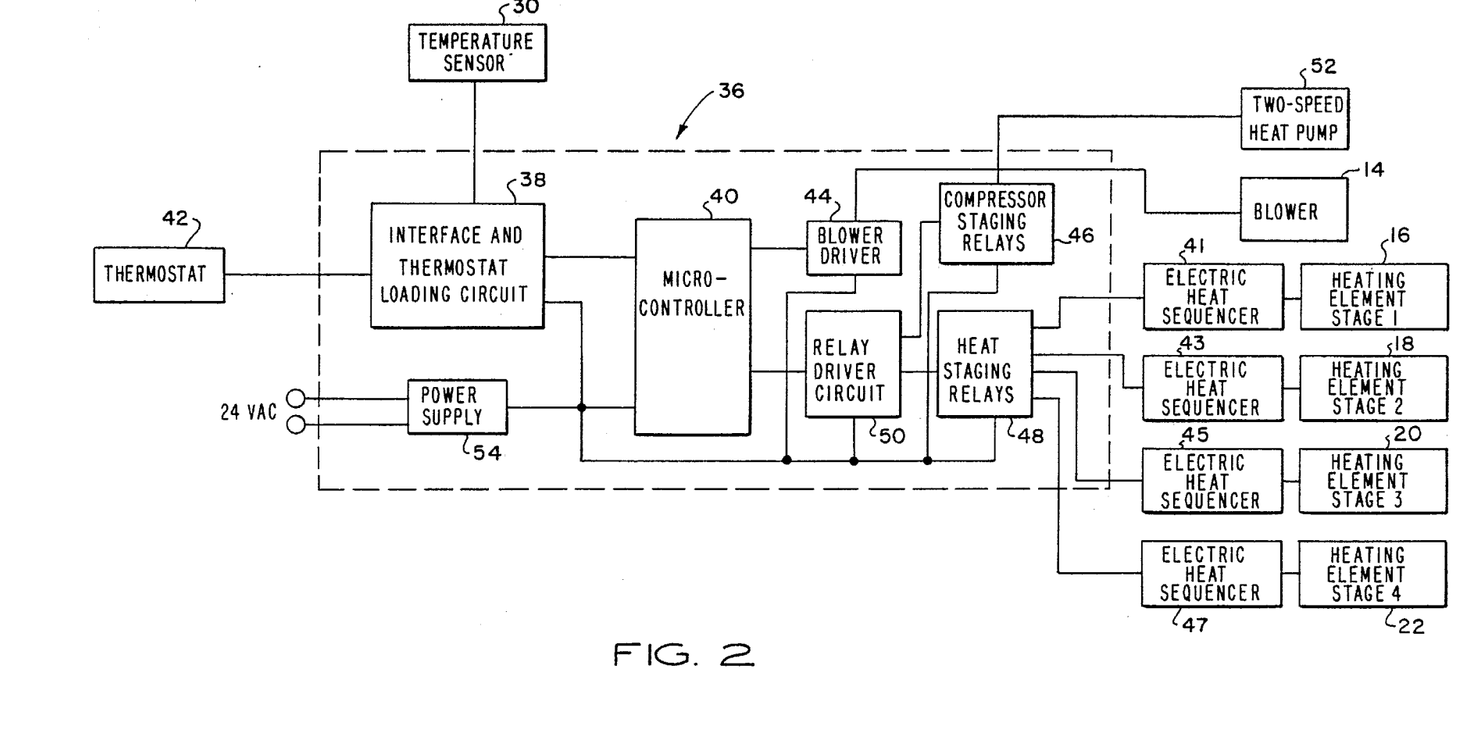
FIG. 2 is an electrical schematic diagram of apparatus for controlling a two-speed heat pump and electrical heating elements, according to the present invention.

Referring also to FIG. 2, apparatus 36 for controlling the operation of a heat pump and electric heating system is depicted schematically. It includes interface and thermostat loading circuitry 38. The interface circuitry interfaces between temperature sensor 30 (which may be operated at 15 volts DC) and a microcontroller 40 (which may be operated at 5 volts DC) and between an indoor thermostat 42 (which may be operated at 24 volts AC) and microcontroller 40. The loading circuitry imposes a defined load on the thermostat anticipator in the conventional manner.

Microcontroller 40 is preferably a microcontroller of the 8051 type, manufactured and sold by Intel. Temperature sensor 30 is preferably an air sensor of the 16J98 type, manufactured and sold by Lennox Industries.

Microcontroller 40 controls blower 14 via a blower driver circuit 44. Microcontroller 40 also controls compressor staging relays 46 and heat staging relays 48 via a relay driver circuit 50. Heat staging relays 48 are used to selectively activate and deactivate heating elements 16, 18, 20, and 22, as will be described in greater detail hereinafter. Compressor staging relays 46 are used to control the operation of a two-speed heat pump compressor 52, as will be described in greater detail hereinafter. Control apparatus 36 further includes a power supply module 54 for converting incoming 24 volt AC power to DC power at selected voltages (e.g., 5 and 15 volts). Sequencers 41, 43, 45, and 47 impose a fixed time delay between successive activations and deactivations of heating elements 16, 18, 20, and 22. The time delay may vary from one system to another.

Figure 3A:
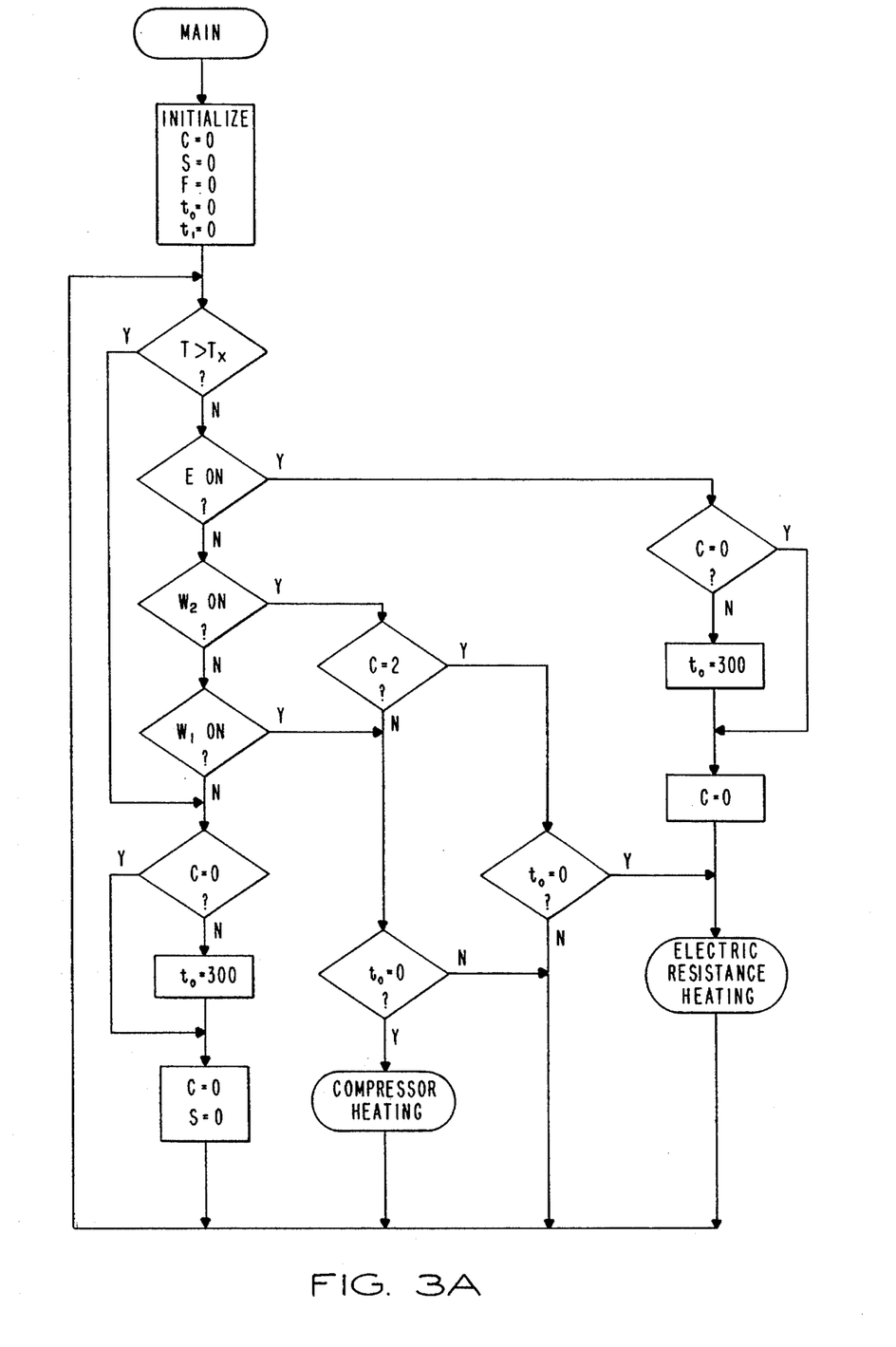
FIGS. 3A–3C are flow diagrams of the operation of one embodiment of the control apparatus.
Figure 3B:
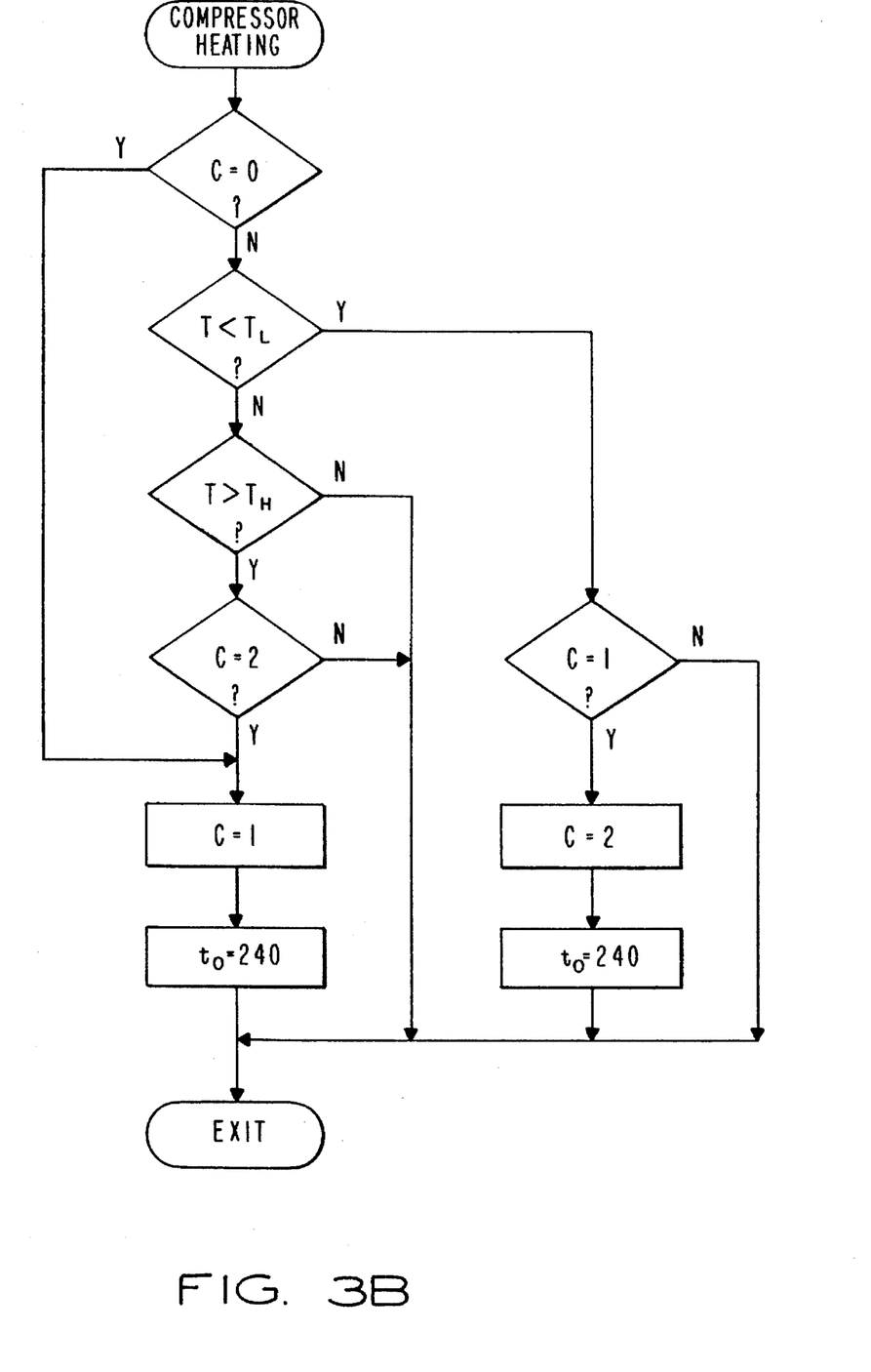
Figure 3C:
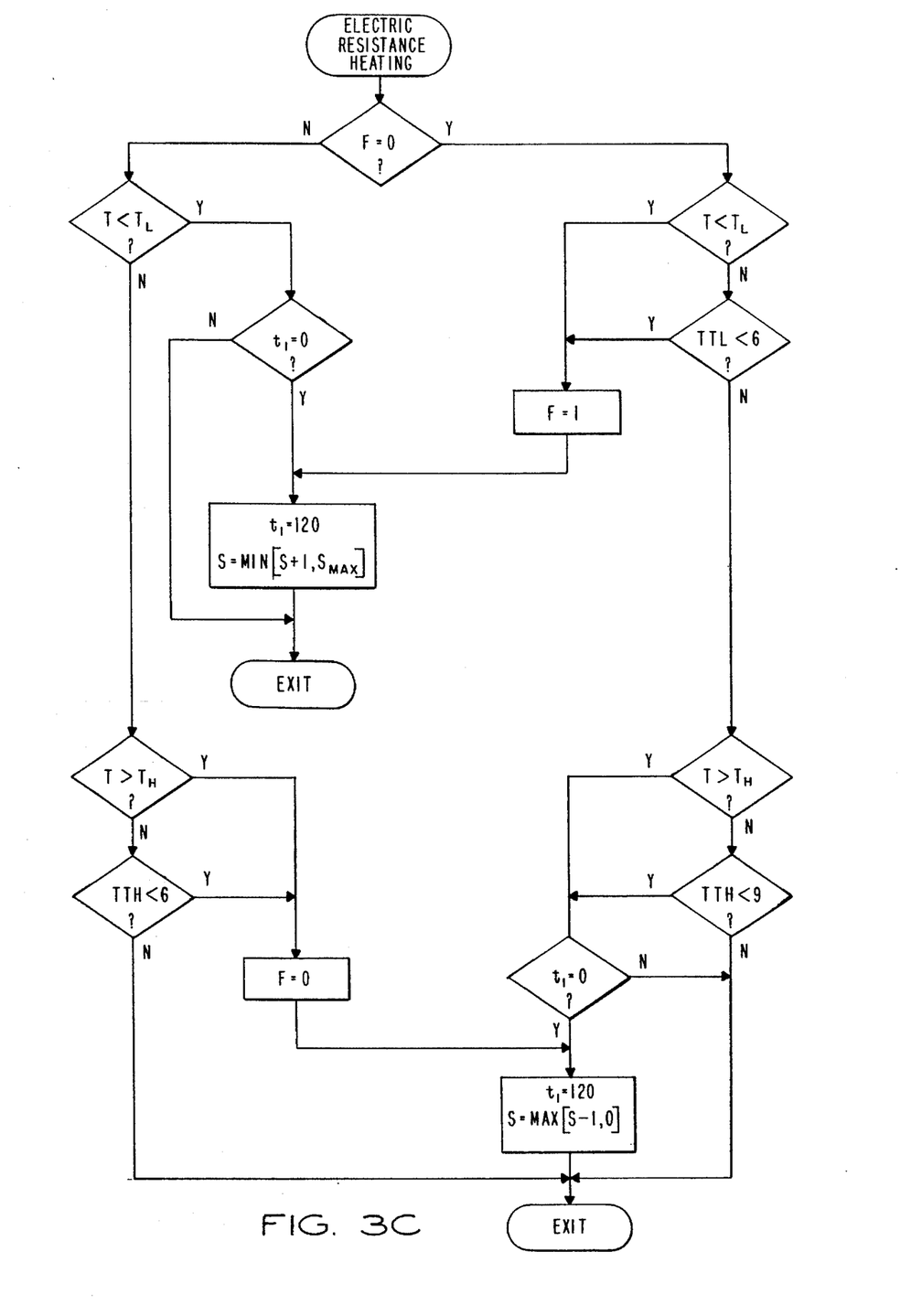

Referring also to FIGS. 3A–3C, the algorithm for controlling the two-speed heat pump compressor 52 and heating elements 16, 18, 20, and 22 is depicted in greater detail. The control algorithm is preferably pre-programmed in microcontroller 40. In FIGS. 3A–3C, C represents the two-speed compressor 52, S represents the heating element stages (i.e., the total number of heating elements 16, 18, 20, and 22 activated), F represents a staging flag (F=0 means "staging down" and F=1 means "staging up"), $t_0$ represents a set time delay for compressor operation and $t_1$ represents a set time delay for heating element operation.

The "Main Program" algorithm is depicted in FIG. 3A. Upon initialization, C, S, F, $t_0$, and $t_1$ are set at zero. T represents the discharge air temperature measured by sensor 30. $T_x$ represents the maximum allowed discharge air temperature. E represents a call for emergency heating. $W_1$ represents a demand for first stage heating. $W_2$ represents a demand for second stage heating, which is a higher demand than for first stage heating. If the measured temperature (T) is greater than the maximum allowed temperature ($T_x$), an overheat condition is indicated. In response to the overheat condition, compressor 52 and all of the heating elements 16, 18, 20, and 22 are maintained in a deactivated condition (C=0 and S=0) and blower 14 is operated until the discharge air temperature (T) falls below a minimum target temperature ($T_L$). Compressor 52 and heating elements 16, 18, 20, and 22 will remain deactivated until T falls below $T_L$. If compressor 52 is deactivated after having been operated, time $t_0$ is set for 300 seconds ($t_0$=300), such that at least 300 seconds must have elapsed before reactivating compressor 52.

If T is not greater than $T_x$, compressor 52 and all of the heating elements 16, 18, 20, and 22 will remain deactivated if there is no demand for heat (i.e., E, $W_2$, and $W_1$ are "off"). If a demand for emergency heat (E) occurs, compressor 52 is bypassed if compressor 52 is not already operating (C=0) and the electrical heating elements 16, 18, 20, and 22 are used to satisfy the heat demand. If compressor 52 is operating at the time of the emergency demand for heat (i.e., C≠0), timer $t_0$ is set for 300 seconds ($t_0$32 300) and compressor 52 is deactivated before entering an "Electrical Resistance Heating" (ERH) routine. Typically, an outdoor thermostat (not shown) is set for a maximum temperature threshold to "lock out" the electrical heating system until the outside ambient temperature falls below the maximum temperature threshold. The demand for emergency heat bypasses the outdoor thermostat so that the electric heating system can be operated.

If there is a second stage demand ($W_2$) and compressor 52 is already operating at high speed (C=2), the ERH routine is entered when timer $t_0$ has been decremented to zero ($t_0$=0). If, however, compressor 52 is not operating at high speed and the timer $t_0$ has been decremented to 0 ($t_0$=0), a "Compressor Heating" (CH) routine is entered whereby compressor 52 is increased to high speed. If there is only a first stage demand ($W_1$), compressor 52 is used to satisfy the first stage demand. The CH routine is implemented after timer $t_0$ has been decremented to 0 ($t_0$=0).

The CH routine is depicted in greater detail in FIG. 3B. If compressor 52 is "off" (C=0), compressor 52 will be activated for low speed operation (C=1) and timer $t_0$ is set at 240 seconds ($t_0$=240). The CH routine is then exited and the algorithm branches back to the beginning of the "Main Program" in FIG. 3A. If, however, compressor 52 is already operating at low speed at the beginning of the CH routine, microcontroller 40 determines whether the discharge air temperature (T) is less than the minimum target temperature ($T_L$). If T is less than $T_L$, compressor 52 is switched to high speed operation (C=2) and the compressor timer $t_0$ is set for 240 seconds ($t_0$=240). If T is not less than $T_L$ and is not greater than a maximum target temperature ($T_H$), the CH routine is exited and the algorithm branches back to the "Main Program". If T is greater than ($T_H$) and compressor 52 is operating at high speed, compressor 52 is reduced to low speed (C=1), the compressor timer $t_0$ is set for 240 seconds ($t_0$240) and the CH routine is exited. At least 240 seconds must have elapsed before compressor 52 can be switched from low to high speed operation or vice-versa.

Referring to FIG. 3C, the ERH routine is depicted in greater detail. When F=0, the routine is in a "staging down" mode, whereby the electrical heating elements are turned off sequentially. When F=1, the routine is in a "staging up" mode, whereby the electrical heating elements are activated sequentially. Considering the first case, in which F=0, if the discharge air temperature is less than the minimum target temperature (T is less than $T_L$), the staging flag F is set to 1 and one additional heating element is activated (i.e., S=S+1). If the heating stage is already at the maximum (i.e., S=$S_{max}$), the heating stage will remain at the maximum. Electrical heating timer $t_1$ is set for 120 seconds. If T is not less than $T_L$, but the time until the discharge air temperature reaches $T_L$ is less than a predetermined number of sampling time intervals (e.g., 6 time intervals), F is set to 1 and the heating stage will be incremented by one to ensure that discharge air temperature T does not fall below minimum target temperature $T_L$ on the way down.

Figure 5:
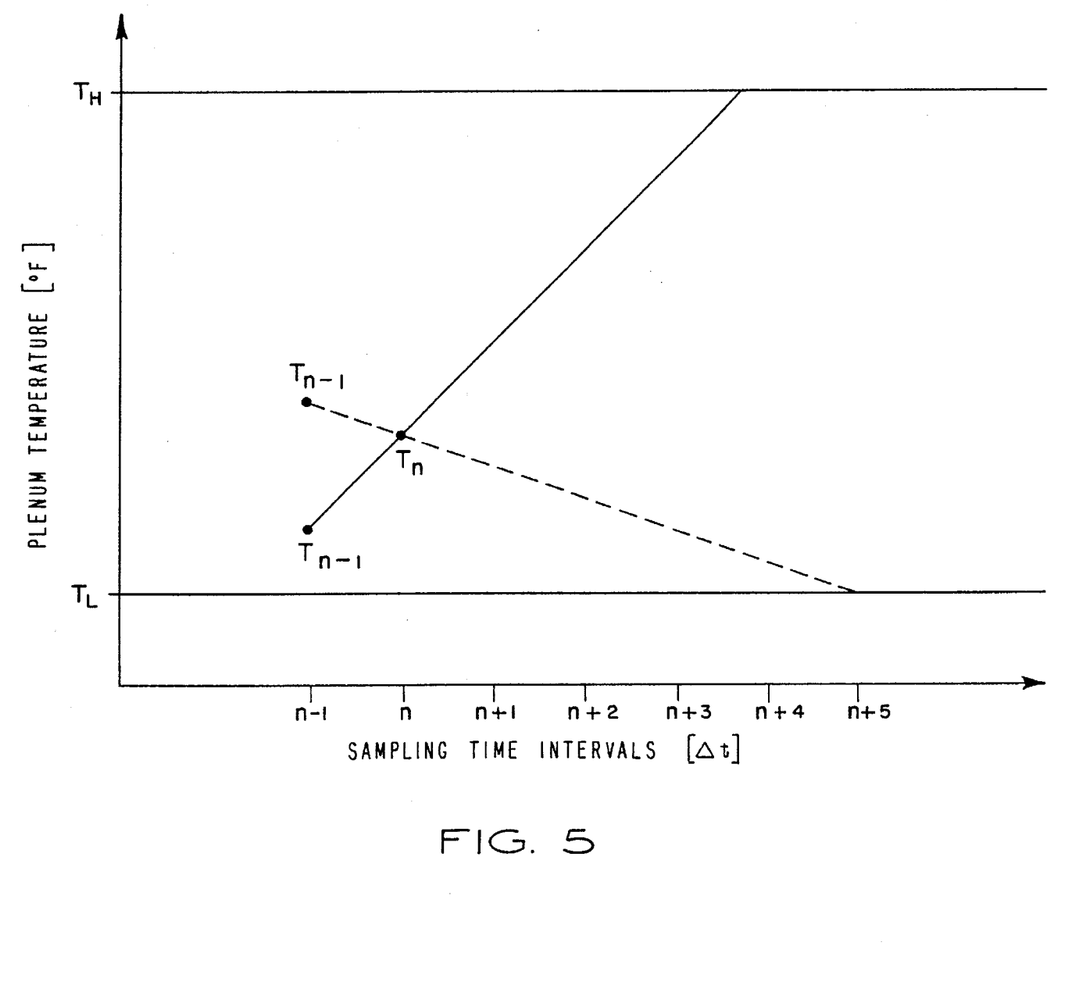
FIG. 5 is a temperature vs. time graph, illustrating the determination of time to target temperature, according to one aspect of the present invention.

Referring to FIG. 5, the process for determining the time to a predetermined target temperature is illustrated. $T_n$ represents the discharge air temperature measured during the most recent sampling interval n and $T_{n-1}$ represents the discharge air temperature measured during the immediately preceding sampling time interval n−1. For example, if each time interval ($\Delta t$) is 10 seconds, a straight line can be plotted on a temperature vs. time graph, the slope of which indicates the time rate of change of the discharge air temperature T. If the discharge air temperature $T_n$ measured during sampling time interval n and the time rate of change thereof indicate that the discharge air temperature T will reach the minimum target temperature $T_L$ within the predetermined number of sampling periods (e.g., 6 sampling periods), an additional heating element is activated. If each sampling interval ($\Delta t$) is 10 seconds, 6 sampling intervals corresponds to 60 seconds. The sequencers often used in an electric heating system to activate the heating elements are typically set for a time delay of approximately 60 seconds between successive activations of the heating elements. Therefore, to account for this time delay, an additional heating element should be activated at least 60 seconds prior to the discharge air temperature T reaching the minimum target temperature $T_L$ on the way down.

The time to the minimum target temperature ($TT_L$) is determined according to the following equation (1):

$$TT_L \begin{cases} 255 & \text{when } T_n = T_{n-1} \\ \min\left[ \dfrac{T_L - T_n}{T_n - T_{n-1}}, 254 \right] & \text{when } T_n \neq T_{n-1} \end{cases} \quad (1)$$

When $T_n = T_{n-1}$, the number 255 corresponds to an infinite number of sampling periods before the discharge air temperature T falls to the minimum target temperature. At 10 seconds per sampling interval, the number 255 represents approximately 2,550 seconds. If $T_n \neq T_{n-1}$1, the time to the minimum target temperature ($TT_L$) is the lesser of the number of sampling intervals expressed by the indicated fraction and 254 sampling intervals.

In one example shown in FIG. 5, dashed line 50 has a negative slope, indicating that $T_n$ is less than $T_{n-1}$ (i.e., the discharge air temperature T is falling toward the minimum target temperature $T_L$). The value of $T_n$ and the slope of line 50 indicate that the discharge air temperature T will fall to the minimum target temperature $T_L$ within five sampling intervals (n+5−n). Therefore, in this example, since $TT_L$ is less than 6, staging flag F would be set to 1 and an additional heating element activated, if available.

If staging flag F is not 0 at the beginning of the ERH routine and T is less than $T_L$, an additional heating element is activated, if available, provided that the timer $t_0$ has been decremented to 0 ($t_1$=0). Therefore, there is a predetermined time delay (e.g., at least 120 seconds) between successive activations of the heating elements in the "staging up" mode. After the heating stage has been incremented by one, the ERH routine is exited.

If the discharge air temperature T exceeds maximum target temperature $T_H$ and the ERH routine is "staging down" (F=0), the heating stage will be decremented by one, provided timer $t_1$ has been decremented to 0 ($t_1$=0). Therefore, there is a predetermined time delay (e.g., at least 120 seconds) between successive deactivations of the heating elements in the "staging down" mode. If all the heating elements are already deactivated, then there will be no change in the state of the heating elements. Decrementing the heating stage by one corresponds to deactivating one of the heating elements (S=S−1). In accordance with the ERH routine, the heating elements are deactivated in reverse sequence from the sequence in which the heating elements are activated.

If the discharge air temperature T exceeds $T_H$ and the ERH routine is in a "staging down" mode and the time to the maximum target temperature ($TT_H$) is less than a predetermined number of sampling intervals (e.g., 9 sampling intervals), the heating stage will still be decremented by one, even if T is not greater than $T_H$, in order to prevent T from overshooting $T_H$ on the high side, provided the time delay condition has been satisfied ($t_1$=0). Similarly, if the ERH routine is in a "staging up" mode, the ERH routine will switch to a "staging down" mode (F=0) if the time to the maximum target temperature ($TT_H$) is less than a predetermined number of sampling intervals (e.g., 6 sampling intervals) and one of the heating elements is deactivated to prevent the discharge air temperature T from overshooting the maximum target temperature $T_H$ on the way up.

In the other example shown in FIG. 5, solid line 60 has a positive slope, as indicated by $T_n$ being greater than $T_{n-1}$. The positive slope of line 60 indicates that the discharge air temperature T is rising and will reach $T_H$ within four sampling intervals (n+4−n). In this example, since $TT_h$ is less than 6, one of the heating elements is deactivated to prevent the discharge air temperature T from overshooting $T_H$ on the way up.

The time to the maximum target temperature ($TT_H$) is determined according to the following equation (2):

$$TT_H \begin{cases} 255 & \text{when } T_n = T_{n-1} \\ \min\left[\dfrac{T_H - T_n}{T_n - T_{n-1}}, 254\right] & \text{when } T_n \neq T_{n-1} \end{cases} \quad (2)$$

Referring again to FIG. 3C, after the heating stage has been incremented or decremented by one, the ERH routine is exited and the algorithm returns to the "Main Program" in FIG. 3A.

The control algorithm depicted in FIGS. 3A–3C coordinately controls a two-speed heat pump compressor and a plurality of electrically resistive heating elements. Referring again to FIGS. 1 and 2, the two-speed heat pump 52 is used as the primary heat source, with the electrical heating elements 16, 18, 20, and 22 as supplements to heat pump 52. Because heat pump 52 can be operated more efficiently than electrical heating elements 16, 18, 20, and 22, heat pump operation is preferred. By separately controlling heating elements 16, 18, 20, and 22, efficiency is enhanced by activating and deactivating only those heating elements necessary to maintain the discharge air temperature within a predetermined range. The delay inherent in the heating element sequencers is accounted for by continually determining the time to a target temperature (either a minimum target temperature or a maximum target temperature) so that the discharge air temperature is maintained within the predetermined range without overshooting the maximum target temperature or undershooting the minimum target temperature. Control apparatus 36 is suitable for retrofit installation in an existing heating system, including a multi-zone heating system.

INDEPENDENT CONTROL OF ELECTRIC HEATING ELEMENTS

Referring now to FIGS. 2 and 4A–4C, an alternate embodiment of an algorithm for controlling heating elements 16, 18, 20, and 22 is shown. In the alternate embodiment, a heat pump compressor is not controlled. Therefore, compressor staging relays are not included in the control apparatus. Otherwise, the control apparatus is substantially the same as shown in FIG. 2.

Figure 4A:
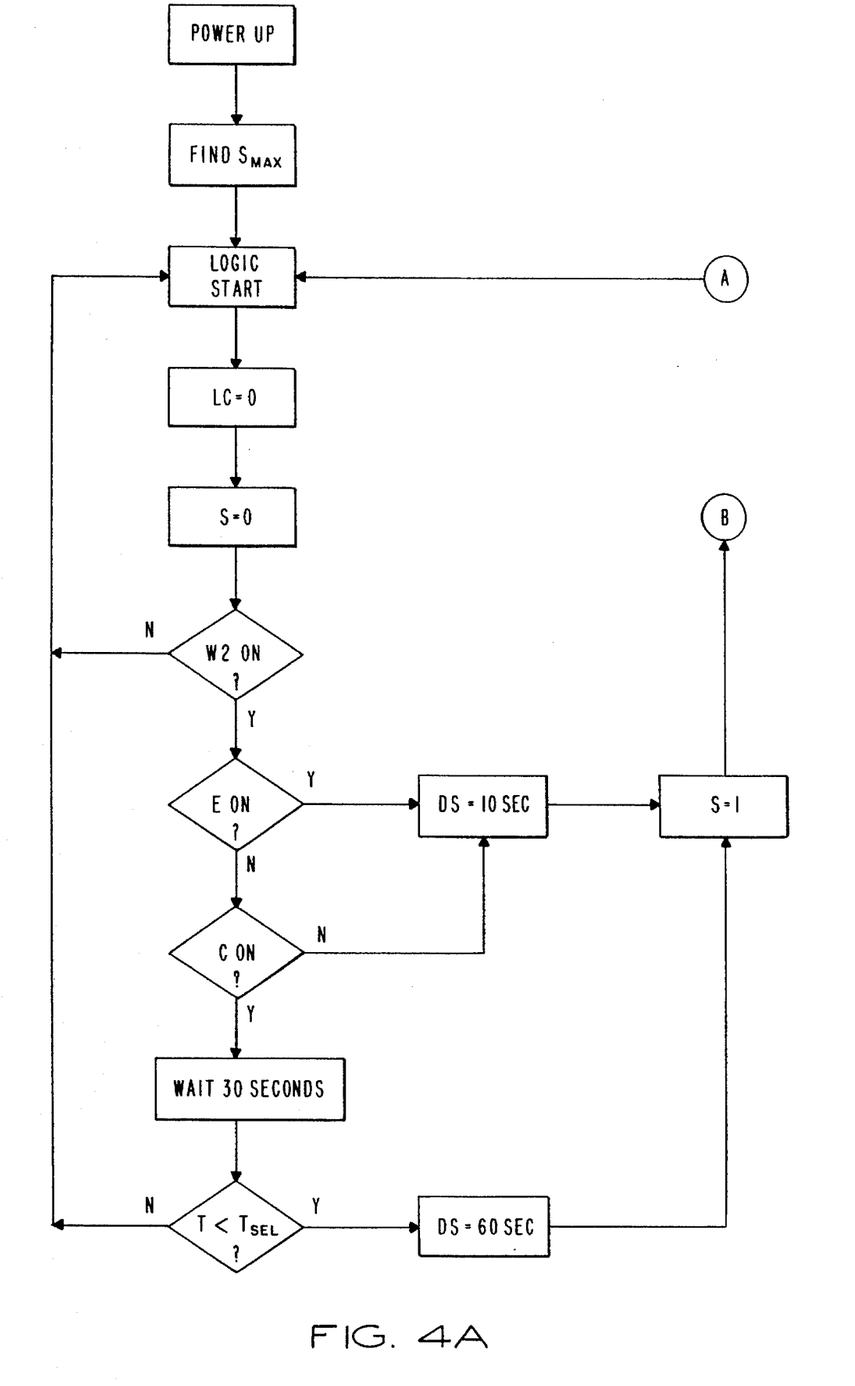
FIGS. 4A–4C are flow diagrams of the operation of an alternate embodiment of the control apparatus.
Figure 4B:
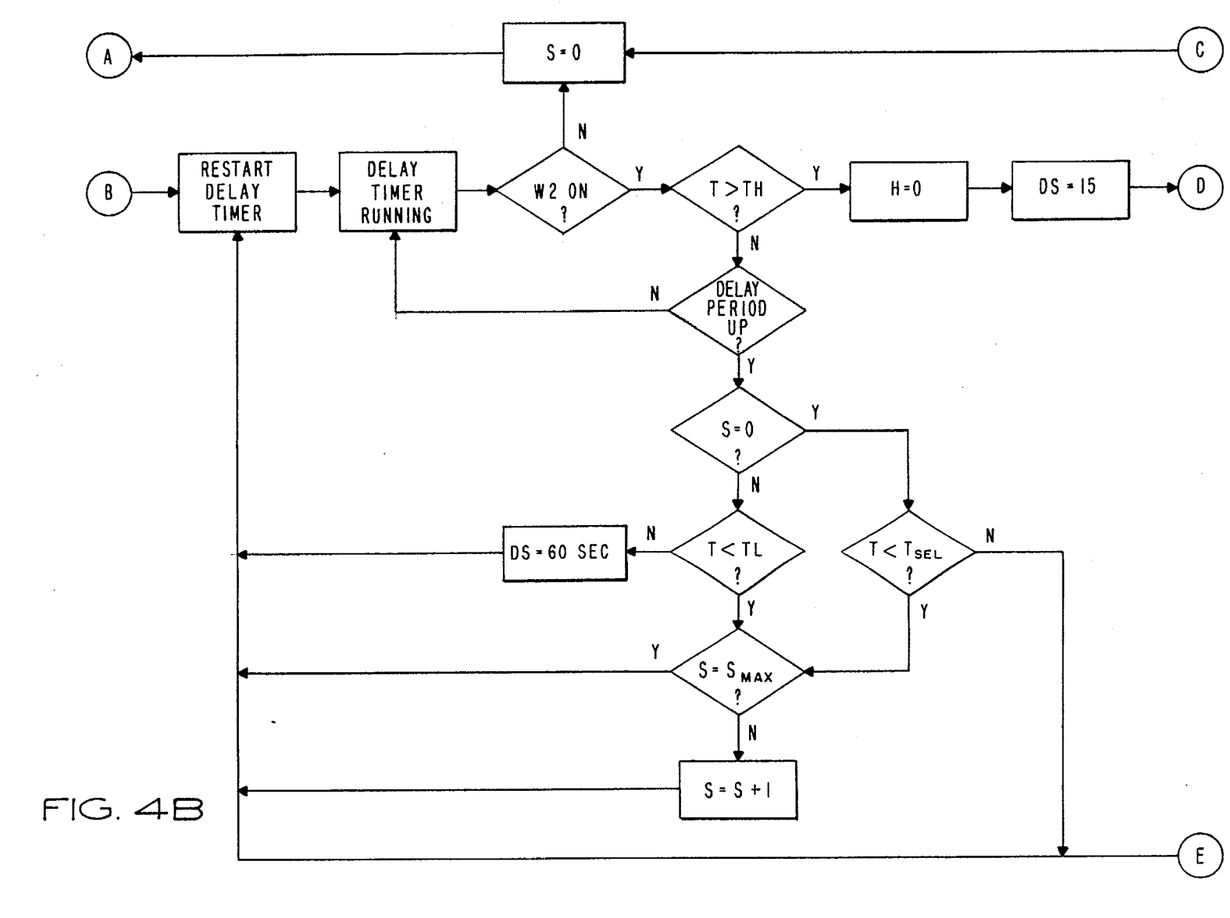
Figure 4C:
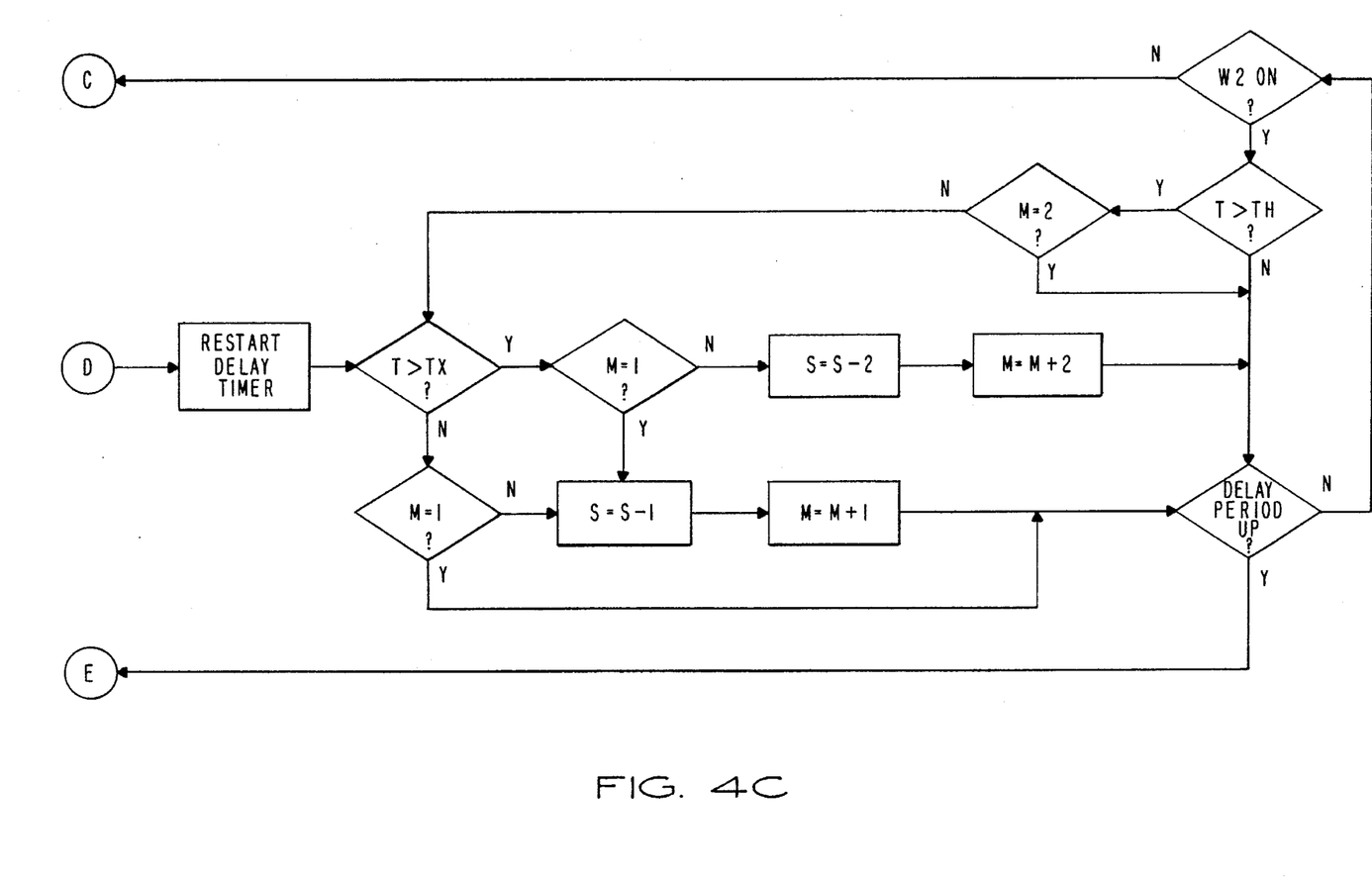

The alternate embodiment of the control apparatus also operates without reference to an outdoor thermostat setting. In many geographic areas, an outdoor thermostat is used to prevent operation of a secondary heat source (e.g., gas furnace or electric heating system) until the outside air temperature drops below a minimum threshold. In the alternate embodiment of the control apparatus, an outdoor thermostat is not used, but rather a minimum discharge air temperature is selected ($T_{sel}$) for activation of the electric heating system. $T_{sel}$ is selected to correspond to a maximum temperature of the outdoor air prescribed by a local utility company or other authority for the use of electric heating. Further, temperature sensor 30 is preferably a negative temperature coefficient thermistor, manufactured and sold by Texas Instruments. In the alternate embodiment, sequencers are not used to delay activation and deactivation of heating elements 16, 18, 20, and 22. The control algorithm includes built-in time delays, as will be described in greater detail hereinafter.

Referring specifically to FIG. 4A, upon initialization of the control routine, microcontroller 40 determines the total number of heating elements available ($S_{max}$). For example, if there are four heating elements, 16, 18, 20, and 22, $S_{max}$ would be four. The limit counter (LC) is set to zero. The limit counter counts the number of times a limit control switch is open. The limit control switch is a thermal switch in the heating system which opens in response to an abnormally high temperature condition in the heating system. Normal operation of the heating system is interrupted in response to an "open limit" condition and a predetermined limit routine is executed, whereby all of the heating elements are deactivated and blower 14 is operated until the heating system has cooled down sufficiently to resume normal operation. The limit control is a standard feature of most heating systems.

Upon initialization of the control routine, the number of activated heating elements (S) is zero. None of the heating elements will be energized until a demand for second stage heating ($W_2$) is received. If a demand for emergency heat (E) is received in addition to the demand for second stage heating, a delay timer is set at 10 seconds (DS=10) and the first heating element is activated (S=1). If there is no demand for emergency heat and the heat pump (C) is not operating in either a heating or cooling mode (i.e., the heat pump compressor is not operating or there is no heat pump), the time delay is also set for 10 seconds and the first heating element is activated. If the heat pump compressor is operating (C is "on"), the time delay is set for 30 seconds and the discharge air temperature (T) is measured upon expiration of the 30-second time delay. If the discharge air temperature (T) is less than the minimum threshold temperature for electric heating system operation ($T_{sel}$), the delay timer is set for 60 seconds and the first heating element is activated. If T is not less than $T_{sel}$, no heating elements will be activated.

After activation of the first heating element, the delay period (60 seconds) is started. If a demand for second stage heating is no longer present ($W_2$ is "off"), all of the heating elements will be deactivated substantially simultaneously (S=0). If the second stage demand is still present and the discharge air temperature (T) is greater than the maximum target temperature ($T_H$), the delay timer will be set for a 15-second time delay. The activated heating elements are sequentially deactivated (S=S−1) to bring the discharge air temperature (T) below $T_H$. If T is greater than the maximum allowed temperature ($T_x$), the activated heating elements are deactivated two at a time (S=S−2), such that two heating elements are deactivated during each 15-second cool down period. If T is not greater than $T_x$, one heating element is deactivated every 15 seconds. The cool down routine will continue until T is less than or equal to $T_H$, with a 15-second time delay between successive deactivations of the heating elements. The number of heating elements which have been deactivated during a particular 15-second cool down cycle is represented by the letter M.

If T is less than or equal to $T_H$ and the applicable time delay (either 10 seconds or 60 seconds, as the case may be) has expired, microcontroller 40 will determine whether the discharge air temperature (T) is greater than the minimum target temperature ($T_L$). If so, the discharge air temperature is within the desired range (i.e., between $T_L$ and $T_H$). In that event, the delay timer is reset for 60 seconds (DS=60 seconds) and microcontroller 40 continues to monitor the discharge air temperature. If the discharge air temperature drops below the minimum target temperature (i.e., T is less than $T_L$), an additional heating element is activated (S=S+1) unless all of the heating elements are already activated (S=$S_{max}$). However, if none of the heating elements are activated (S=0), the discharge air temperature must be less than the minimum selected temperature (i.e., T is less than $T_{sel}$) before the first heating element is activated. Therefore, none of the heating elements will be used until the discharge air temperature drops below the minimum selected temperature.

If, however, at least one of the heating elements has already been activated, an additional heating element will be activated if the discharge air temperature is below the minimum target temperature ($T_L$), which may be greater than $T_{sel}$. At least every 500 milliseconds, microcontroller 40 checks for an "open limit" condition, which indicates an abnormally high temperature condition. In the event of an "open limit" condition, the control routine is interrupted until the heating system has been cooled down sufficiently to resume normal operation.

In accordance with another feature of the invention, the discharge air temperature as measured by sensor 30 is used to control the "off cycle" of blower 14. According to prior practice, a fixed time delay is imposed before the heating system blower is turned off when there is no demand for heat. In accordance with the present invention, the blower is turned off only after a selected condition has been satisfied.

Blower 14 is always operating in response to a demand for second stage heat ($W_2$ is "on"), when the heat pump compressor is operating in either a heating or cooling mode (C is "on"), or if blower 14 is set for manual operation. Even if none of the aforementioned three conditions is present, blower 14 will continue to be operated until a selected condition is satisfied, as will be described in greater detail hereinafter.

If the heating system is coordinately operated with a heat pump, as depicted in FIG. 1, blower 14 will be deactivated if the heat pump compressor 33 is not operating and the heat pump reversing valve 34 is set in a heating mode when the discharge air temperature (T) is below a maximum threshold temperature (e.g., 90° F. or less). If the discharge air temperature is 90° F. or more, blower 14 is operated to cool down the heating system. In the event of the absence or malfunction of sensor 30, blower 14 is deactivated after a predetermined time delay (e.g., 10 seconds) following the cessation of the demand for blower operation.

If the heat pump compressor 33 is not operating and the heat pump reversing valve 34 is reversed for cooling or defrost operation, indoor coil 32 of the heat pump is being cooled and blower 14 is used to blow warm air across coil 32. Blower 14 is operated until the discharge air temperature is at least equal to a minimum threshold temperature (65° F. or greater) to improve system cycling efficiency. In the event of the absence or malfunction of sensor 30, a predetermined time delay (e.g., 45 seconds) from the cessation of the demand for blower operation is imposed before blower 14 is deactivated.

If the electric heating system is not coordinately operated with a heat pump, blower 14 is operated until the discharge air temperature (T) is equal to or below a predetermined maximum threshold temperature (e.g., 90° F. or less) in order to remove residual heat from the heating system. In the absence of sensor 30 or in the event of a malfunction thereof, blower 14 is deactivated after a predetermined time delay (e.g., 10 seconds) following cessation of the demand for blower operation.

In accordance with the present invention, the electrically activatable heating elements of an electric heating system are independently controllable so that only those heating elements which are needed to satisfy the demand for heat are activated, thereby conserving energy and reducing cost. The heating elements are preferably sequentially activated and deactivated as required to maintain the temperature of the discharge air within a predetermined range. A predetermined time delay is imposed between successive activations and deactivations of the heating elements to allow time for the heating system to satisfy an increased demand for heat or to respond to a reduced demand for heat, as the case may be. In one embodiment, a two-stage heat pump is coordinately controlled along with an electric heating system. In an alternate embodiment, an electric heating system is controlled separately from the heat pump.

Various embodiments of the invention have now been described in detail. Since it is obvious that changes in and additions to the above-described preferred embodiments may be made without departing from the nature, spirit and scope of the invention, the invention is not to be limited to the details described above.

We claim:

1. In a heating system having a supply air duct in communication with an enclosure, an air mover for moving air in a predetermined direction within the duct to provide a supply air stream to the enclosure, a plurality of heaters located in the duct for heating the supply air stream and a thermostat for providing a demand for heat signal in response to the enclosure temperature being less than a predetermined temperature setting, apparatus for controlling the heaters, said apparatus comprising:

temperature sensing means at a selected location in the duct downstream from the heaters in the predetermined direction for sensing temperature of the supply air stream at said selected location and for providing an indication of sensed temperature; and control means responsive only to the demand for heat signal and to an indication that the sensed temperature is less than a predetermined first temperature for sequentially activating one or more heaters until the sensed temperature is greater than or equal to said first temperature, said control means being further responsive only to the demand for heat signal and to an indication that the sensed temperature is greater than a predetermined second temperature which is greater than said first temperature for sequentially deactivating one or more of the activated heaters until the sensed temperature is less than or equal to said second temperature, said control means being responsive to cessation of the demand for heat signal for deactivating all of the activated heaters.

2. Apparatus of claim 1 wherein said temperature sensing means is a single thermistor.

3. Apparatus for conditioning air in an enclosure having a thermostat for providing a demand for heat signal in response to the enclosure temperature being less than a predetermined temperature setting, said apparatus comprising:

air supply means having an air supply duct in communication with the enclosure and an air mover for moving air in a predetermined direction within said duct to provide a supply air stream to the enclosure;

heat pump means having an indoor heat exchanger in heat exchange relationship with the supply air stream, an outdoor heat exchanger and a compressor for circulating a heat transfer fluid between said indoor and outdoor heat exchangers to condition the supply air stream, said heat pump means being operative to heat the supply air stream in response to the demand for heat signal;

supplemental heating means located in said duct for heating the supply air stream;

temperature sensing means at a selected location in said duct downstream from both said indoor heat exchanger and said supplemental heating means in the predetermined direction for sensing temperature of the supply air stream at said selected location and for providing an indication of sensed temperature; and control means for activating said supplemental heating means to heat the supply air stream in response to the sensed temperature being less than a predetermined temperature.

4. Apparatus of claim 3 wherein said supplemental heating means includes a plurality of heaters, said control means being responsive to the demand for heat signal and to the sensed temperature being less than a predetermined first temperature for sequentially activating said heaters until the sensed temperature is greater than or equal to said first temperature, said control means being further responsive to said demand for heat signal and to the sensed temperature being greater than a predetermined second temperature which is greater than said first temperature for sequentially deactivating the activated heaters until the sensed temperature is less than or equal to said second temperature, said control means being further responsive to cessation of said demand for heat signal for deactivating said heat pump means and the activated heaters.

5. Apparatus of claim 4 wherein said heat pump means is operable in first and second modes, said second mode corresponding to a higher rate of heating of the supply air stream than said first mode, said control means being operable to control said heat pump means to operate in said first mode in response to said demand for heat signal and the sensed temperature being greater than or equal to said first temperature and to operate in said second mode in response to said demand for heat signal and the sensed temperature being less than said first temperature, said control means being operable to inhibit activation of said heaters until said heat pump means has been operated in said second mode for a predetermined time.

6. Apparatus of claim 5 wherein said control means includes delay means for imposing a predetermined time delay between operation of said heat pump means in said first mode and operation of said heat pump means in said second mode.

7. Apparatus of claim 4 herein said heat pump means is operable in a heating mode and a cooling mode, said control means further including means for activating said air mover in response to said heat pump means being operated in either said heating mode or said cooling mode and for deactivating said air mover in response to both said heat pump means not being operated in either said heating mode or said cooling mode and satisfaction of a predetermined supply air stream temperature condition.

8. Apparatus of claim 7 wherein said supply air stream temperature condition is satisfied when said heat pump means is not being operated after having been operated in said heating mode and the supply air stream temperature is less than a predetermined third temperature or alternatively when said heat pump means is not being operated after having been operated in said cooling mode and the supply air stream temperature is above a fourth temperature which is less than said third temperature.

9. Apparatus of claim 3 wherein said temperature sensing means is a single thermistor.

10. Apparatus of claim 3 wherein said control means including means for activating said air mover in response to said demand for heat signal and for deactivating said air mover in response to absence of said demand for heat signal and satisfaction of a predetermined condition of the supply air stream temperature.

* * * * *